United States Patent [19]

Schulz, Jr. et al.

[11] Patent Number: 5,654,362
[45] Date of Patent: Aug. 5, 1997

[54] SILICONE OILS AND SOLVENTS THICKENED BY SILICONE ELASTOMERS

[75] Inventors: William James Schulz, Jr.; Shizhong Zhahg, both of Midland, Mich.

[73] Assignee: Dow Corning Corporation, Midland, Mich.

[21] Appl. No.: 618,616

[22] Filed: Mar. 20, 1996

[51] Int. Cl.$^6$ .................................................. C08L 83/05
[52] U.S. Cl. .................. 524/862; 528/15; 528/25; 528/31; 523/122; 424/401; 524/731
[58] Field of Search ........................ 528/15, 25, 31; 524/731, 862; 424/401; 523/122

[56] References Cited

U.S. PATENT DOCUMENTS

| | | | |
|---|---|---|---|
| 3,418,353 | 12/1968 | Brown . | |
| 3,450,736 | 6/1969 | De Monterey . | |
| 4,172,101 | 10/1979 | Getson | 525/101 |
| 4,987,169 | 1/1991 | Kuwata | 524/267 |
| 5,236,986 | 8/1993 | Sakuta | 524/267 |
| 5,412,004 | 5/1995 | Tacibana | 524/27 |
| 5,493,041 | 2/1996 | Biggs | 556/453 |

OTHER PUBLICATIONS

"Development of New Thickening Agent for Silicone Oils", Koji Sckuta, IFSCC Yokahama, Oct. 1992.

*Primary Examiner*—Ralph H. Dean
*Attorney, Agent, or Firm*—James L. DeCesare

[57] ABSTRACT

Silicone gels are made by reacting an $\equiv$Si—H containing polysiloxane with an alpha, omega-diene. The reaction is conducted in the presence of a platinum catalyst and in the presence of a low molecular weight silicone oil. The reaction is continued until a gel is formed by crosslinking and addition of $\equiv$Si—H across double bonds in the alpha, omega-diene. The silicone gel can then be crumbled into a silicone powder using mechanical force. When additional amounts of low molecular weight silicone oil are added to the gel, and the silicone oil and the gel are subjected to shear force, a silicone paste can be formed.

18 Claims, No Drawings

SILICONE OILS AND SOLVENTS THICKENED BY SILICONE ELASTOMERS

CROSS-REFERENCE TO RELATED APPLICATIONS

This application contains subject matter related to prior copending application U.S. Ser. No. 08/596,853, filed on Feb. 5, 1996, entitled "Silicone Latex Solvent Thickening". The prior application is assigned to the same assignee as this application.

BACKGROUND OF THE INVENTION

This invention is directed to thickened silicone oils in the form of silicone elastomers swollen into silicone gels, silicone pastes, or silicone powders.

Cross-links are junctions of polymer strands in a three-dimensional network. They may be viewed as long-chain branches which are so numerous that a continuous insoluble network or gel is formed.

Increasingly, platinum catalyzed hydrosilylation reactions are being used to form networks. They typically involve reactions between a low molecular weight polysiloxane containing several $\equiv$Si—H groups, and a high molecular weight polysiloxane containing several $\equiv$Si-vinyl groups, or vice versa.

Attractive features of this mechanism are that (i) no by-products are formed, (ii) cross-linking sites and hence network architecture can be narrowly defined, and (iii) hydrosilylation will proceed even at room temperature to form the networks. In the mechanism, crosslinking involves addition of $\equiv$SiH across double bonds, i.e., $\equiv$SiH+ $CH_2$=CH—R→$\equiv$SiCH$_2$CH$_2$—R.

We have utilized this mechanism, but by employing some unobvious and unique modifications of the mechanism, we have been able to formulate a new range of product forms having new and unique properties and ranges of application.

BRIEF SUMMARY OF THE INVENTION

Our invention relates to methods of thickening silicone oils or other solvents to gel-like consistency by reacting (A) an $\equiv$Si—H containing polysiloxane of formula $R_3SiO(R'_2SiO)_a(R"HSiO)_bSiR_3$ and optionally an $\equiv$Si—H containing polysiloxane of formula $HR_2SiO(R'_2SiO)_cSiR_2H$ or formula $HR_2SiO(R'_2SiO)_a(R"HSiO)_bSiR_2H$ where R, R', and R" are alkyl groups with 1–6 carbon atoms; a is 0–250; b is 1–250; and c is 0–250; with (B) an alpha, omega-diene of formula $CH_2$=CH(CH$_2$)$_x$CH=CH$_2$ where x is 1–20. The reaction is conducted in the presence of a platinum catalyst and in the presence of (C) a low molecular weight silicone oil or other solvent.

The low molecular weight silicone oil is preferably a volatile oil, although non-volatile oils can also be used. The reaction is continued until a gel is formed by crosslinking and addition of $\equiv$Si—H across double bonds in the alpha, omega-diene.

In a second embodiment, we crumble the silicone gel into a silicone powder using mechanical force.

In a third embodiment, we add additional low molecular weight silicone oil to the gel, and subject the oil and the gel to shear force, until a silicone paste is formed.

These and other objects of our invention will become apparent from a consideration of the following detailed description.

DETAILED DESCRIPTION

Silicone elastomers are prepared by a crosslinking reaction between (A) $\equiv$Si—H containing polysiloxanes and (B) an alpha, omega-diene in the presence of a platinum catalyst and (C) a low molecular weight linear or cyclic polysiloxane. The elastomers can be swollen with the low molecular weight polysiloxane under a shear force. Elastomers containing 65–98 weight percent of the low molecular weight polysiloxane are stable and form uniform silicone pastes with a wide viscosity range.

The silicone pastes have excellent properties including clarity, thixotropy, shear thinning, and spread smoothly on the skin. They can be applied in cosmetic and medical products as the base oil. The silicone elastomers are capable of being crumbled to form a silicone powder. The silicone powder has the unique property of being easily rubbed-in on the skin, and silicone resins can be incorporated therein to improve the substantivity of formulations applied to the skin. These materials are ideal for use in solid cosmetics such as antiperspirants and deodorants.

The $\equiv$Si—H containing polysiloxane (A) is represented by compounds of the formula $R_3SiO(R'_2SiO)_a(R"HSiO)_bSiR_3$ designated herein as type $A^1$ and compounds of the formula $HR_2SiO(R'_2SiO)_cSiR_2H$ or formula $HR_2SiO(R'_2SiO)_a(R"HSiO)_bSiR_2H$ designated herein as type $A^2$. In these formulas, R, R', and R", are alkyl groups with 1–6 carbon atoms; a is 0–250; b is 1–250; and c is 0–250. The molar ratio of compounds $A^2$:$A^1$ is 0–20, preferably 0–5. In our most preferred embodiment, compounds of types $A^1$ and $A^2$ are used in the reaction, however, it is possible to successfully conduct the reaction using only compounds of type $A^1$.

The alpha, omega-diene (B) is a compound of the formula $CH_2$=CH(CH$_2$)$_x$CH=CH$_2$ where x is 1–20. Some representative examples of suitable alpha, omega-dienes for use herein are 1,4-pentadiene; 1,5-hexadiene; 1,6-heptadiene; 1,7-octadiene; 1,8-nonadiene; 1,9-decadiene; 1,11-dodecadiene; 1,13-tetradecadiene; and 1,19-eicosadiene.

The addition and crosslinking reaction requires a catalyst to effect the reaction between the $\equiv$SiH containing polysiloxane and the alpha, omega-diene. Suitable catalysts are Group VIII transition metals, i.e., the noble metals. Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing about one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. The noble metal catalysts are used in amounts from 0.00001–0.5 parts per 100 weight parts of the $\equiv$SiH containing polysiloxane, preferably 0.00001–0.02 parts, most preferably 0.00001–0.002 parts.

The phrase low molecular weight silicone oil (C) is intended to include (i) low molecular weight linear and cyclic volatile methyl siloxanes, (ii) low molecular weight linear and cyclic volatile and non-volatile alkyl and aryl siloxanes, and (iii) low molecular weight linear and cyclic functional siloxanes. Most preferred, however, are low molecular weight linear and cyclic volatile methyl siloxanes (VMS).

VMS compounds correspond to the average unit formula $(CH_3)_aSiO_{(4-a)/2}$ in which a has an average value of two to three. The compounds contain siloxane units joined by $\equiv Si-O-Si\equiv$ bonds. Representative units are monofunctional "M" units $(CH_3)_3SiO_{1/2}$ and difunctional "D" units $(CH_3)_2SiO_{2/2}$.

The presence of trifunctional "T" units $CH_3SiO_{3/2}$ results in the formation of branched linear or cyclic volatile methyl siloxanes. The presence of tetrafunctional "Q" units $SiO_{4/2}$ results in the formation of branched linear or cyclic volatile methyl siloxanes.

Linear VMS have the formula $(CH_3)_3SiO\{(CH_3)_2SiO\}_ySi(CH_3)_3$. The value of y is 0–5. Cyclic VMS have the formula $\{(CH_3)_2SiO\}_z$. The value of z is 3–6. Preferably, these volatile methyl siloxane have boiling points less than about 250° C. and viscosities of about 0.65–5.0 centistokes ($mm^2/s$).

These volatile methyl siloxanes can be represented by:

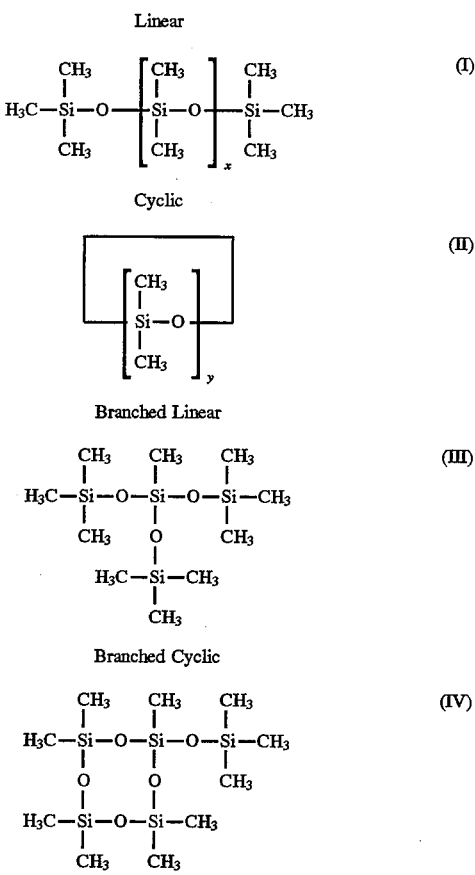

Representative linear volatile methyl siloxanes (I) are hexamethyldisiloxane (MM) with a boiling point of 100° C., viscosity of 0.65 $mm^2/s$, and formula $Me_3SiOSiMe_3$; octamethyltrisiloxane (MDM) with a boiling point of 152° C., viscosity of 1.04 $mm^2/s$, and formula $Me_3SiOMe_2SiOSiMe_3$; decamethyltetrasiloxane ($MD_2M$) with a boiling point of 194° C., viscosity of 1.53 $mm^2/s$, and formula $Me_3SiO(Me_2SiO)_2SiMe_3$; dodecamethylpentasiloxane ($MD_3M$) with a boiling point of 229° C., viscosity of 2.06 $mm^2/s$, and formula $Me_3SiO(Me_2SiO)_3SiMe_3$; tetradecamethylhexasiloxane ($MD_4M$) with a boiling point of 245° C., viscosity of 2.63 $mm^2/s$, and formula $Me_3SiO(Me_2SiO)_4SiMe_3$; and hexadecamethylheptasiloxane ($MD_5M$) with a boiling point of 270° C., viscosity of 3.24 $mm^2/s$, and formula $Me_3SiO(Me_2SiO)_5SiMe_3$.

Representative cyclic volatile methyl siloxanes (II) are hexamethylcyclotrisiloxane ($D_3$) a solid with a boiling point of 134° C. and formula $\{(Me_2)SiO\}_3$; octamethylcyclotetrasiloxane ($D_4$) with a boiling point of 176° C., viscosity of 2.3 $mm^2/s$, and formula $\{(Me_2)SiO\}_4$; decamethylcyclopentasiloxane ($D_5$) with a boiling point of 210° C., viscosity of 3.87 $mm^2/s$, and formula $\{(Me_2)SiO\}_5$; and dodecamethylcyclohexasiloxane ($D_6$) with a boiling point of 245° C., viscosity of 6.62 $mm^2/s$, and formula $\{(Me_2)SiO\}_6$.

Representative branched volatile methyl siloxanes (III) and (IV) are heptamethyl-3-{(trimethylsilyl)oxy}trisiloxane ($M_3T$) with a boiling point of 192° C., viscosity of 1.57 $mm^2/s$, and formula $C_{10}H_{30}O_3Si_4$; hexamethyl-3,3,bis{(trimethylsilyl)oxy}trisiloxane ($M_4Q$) with a boiling point of 222° C., viscosity of 2.86 $mm^2/s$, and formula $C_{12}H_{36}O_4Si_5$; and pentamethyl{(trimethylsilyl)oxy}cyclotrisiloxane ($MD_3$) with the formula $C_8H_{24}O_4Si_4$.

As previously noted, our process also includes using low molecular weight linear and cyclic volatile and non-volatile alkyl and aryl siloxanes. Representative linear polysiloxanes are compounds of the formula $R_3SiO(R_2SiO)_ySiR_3$, and representative cyclic polysiloxanes are compounds of the formula $(R_2SiO)_z$. R is an alkyl group of 1–6 carbon atoms, or an aryl group such as phenyl. The value of y is 0–80, preferably 0–20. The value of z is 0–9, preferably 4–6. These polysiloxanes have viscosities generally in the range of about 1–100 centistokes ($mm^2/s$).

Other representative low molecular weight non-volatile polysiloxanes have the general structure:

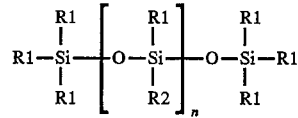

where n has a value to provide polymers with a viscosity in the range of about 100–1,000 centistokes ($mm^2/sec$).

R1 and R2 are alkyl radicals of 1–20 carbon atoms, or an aryl group such as phenyl. Typically, the value of n is about 80–375. Illustrative polysiloxanes are polydimethylsiloxane, polydiethylsiloxane, polymethylethylsiloxane, polymethylphenylsiloxane, and polydiphenylsiloxane.

Low molecular weight functional polysiloxanes can be represented by acrylamide functional siloxane fluids, acrylate functional siloxane fluids, amide functional siloxane fluids, amino functional siloxane fluids, carbinol functional siloxane fluids, carboxy functional siloxane fluids, chloroalkyl functional siloxane fluids, epoxy functional siloxane fluids, glycol functional siloxane fluids, ketal functional siloxane fluids, mercapto functional siloxane fluids, methyl ester functional siloxane fluids, perfluoro functional siloxane fluids, and silanol functional siloxanes.

Our invention is not limited to swelling silicone elastomers with only low molecular weight polysiloxanes. Other types of solvents can swell the silicone elastomer. Thus, a single solvent or a mixture of solvents may be used.

By solvent we mean (i) organic compounds, (ii) compounds containing a silicon atom, (iii) mixtures of organic compounds, (iv) mixtures of compounds containing a silicon atom, or (v) mixtures of organic compounds and compounds containing a silicon atom; used on an industrial scale to dissolve, suspend, or change the physical properties of other materials.

In general, the organic compounds are aromatic hydrocarbons, aliphatic hydrocarbons, alcohols, aldehydes, ketones, amines, esters, ethers, glycols, glycol ethers, alkyl halides, or aromatic halides. Representative of some common organic solvents are alcohols such as methanol, ethanol, 1-propanol, cyclohexanol, benzyl alcohol, 2-octanol, ethylene glycol, propylene glycol, and glycerol; aliphatic hydrocarbons such as pentane, cyclohexane, heptane, VM&P solvent, and mineral spirits; alkyl halides such as chloroform, carbon tetrachloride, perchloroethylene, ethyl chloride, and chlorobenzene; amines such as isopropylamine, cyclohexylamine, ethanolamine, and diethanolamine; aromatic hydrocarbons such as benzene, toluene, ethylbenzene, and xylene; esters such as ethyl acetate, isopropyl acetate, ethyl acetoacetate, amyl acetate, isobutyl isobutyrate, and benzyl acetate; ethers such as ethyl ether, n-butyl ether, tetrahydrofuran, and 1,4-dioxane; glycol ethers such as ethylene glycol monomethyl ether, ethylene glycol monomethyl ether acetate, diethylene glycol monobutyl ether, and propylene glycol monophenyl ether; ketones such as acetone, methyl ethyl ketone, cyclohexanone, diacetone alcohol, methyl amyl ketone, and diisobutyl ketone; petroleum hydrocarbons such as mineral oil, gasoline, naphtha, kerosene, gas oil, heavy oil, and crude oil; lubricating oils such as spindle oil and turbine oil; and fatty oils such as corn oil, soybean oil, olive oil, rape seed oil, cotton seed oil, sardine oil, herring oil, and whale oil.

"Other" miscellaneous organic solvents can also be used, such as acetonitrile, nitromethane, dimethylformamide, propylene oxide, trioctyl phosphate, butyrolactone, furfural, pine oil, turpentine, and m-creosol.

We further intend to encompass by the term solvent, volatile flavoring agents such as oil of wintergreen; peppermint oil; spearmint oil; menthol; vanilla; cinnamon oil; clove oil; bay oil; anise oil; eucalyptus oil; thyme oil; cedar leaf oil; oil of nutmeg; oil of sage; cassia oil; cocoa; licorice; high fructose corn syrup; citrus oils such as lemon, orange, lime, and grapefruit; fruit essences such as apple, pear, peach, grape, strawberry, raspberry, cherry, plum, pineapple, and apricot; and other useful flavoring agents including aldehydes and esters such as cinnamyl acetate, cinnamaldehyde, eugenyl formate, p-methylanisole, acetaldehyde, benzaldehyde, anisic aldehyde, citral, neral, decanal, vanillin, tolyl aldehyde, 2,6-dimethyloctanal, and 2-ethyl butyraldehyde.

In addition, we intend the term solvent to include volatile fragrances such as natural products and perfume oils. Some representative natural products and perfume oils are ambergris, benzoin, civet, clove, leaf oil, jasmine, mate, mimosa, musk, myrrh, orris, sandalwood oil, and vetivert oil; aroma chemicals such as amyl salicylate, amyl cinnamic aldehyde, benzyl acetate, citronellol, coumarin, geraniol, isobornyl acetate, ambrette, and terpinyl acetate; and the various classic family perfume oils such as the floral bouquet family, the oriental family, the chypre family, the woody family, the citrus family, the canoe family, the leather family, the spice family, and the herbal family.

Carrying out of the process is simply a matter of combining the $\equiv$SiH containing polysiloxane(s), the alpha, omega-diene, the low molecular weight silicone oil or other solvent, and the catalyst; and mixing these ingredients at room temperature until a gel is formed. Higher temperatures to speed up the process can be used, if desired.

Additional amounts of the low molecular weight silicone oil or solvent are then added to the gel, and the resulting mixture is subjected to shear force to form the paste. Any type of mixing and shearing equipment may be used to perform these steps such as a batch mixer, planetary mixer, single or multiple screw extruder, dynamic or static mixer, colloid mill, homogenizer, sonolator, or a combination thereof.

Typically, we carry out the process using approximately a 1:1 molar ratio of $\equiv$Si—H containing polysiloxane and alpha, omega-diene. It is expected that useful materials may also be prepared by carrying out the process with an excess of either the $\equiv$Si—H containing polysiloxane or the alpha, omega-diene, but this would be considered a less efficient use of the materials. The remainder of the composition comprises the low molecular weight silicone oil or other solvent in amounts generally within the range of about 65–98 percent by weight of the composition, preferably about 80–98 percent by weight.

The following examples illustrate our invention in more detail.

EXAMPLE I 50 g of an organopolysiloxane with the average structure $Me_3SiO(Me_2SiO)_{34}(MeHSiO)_4SiMe_3$, 2.75 g of 1,5-hexadiene, and 264 g of octamethylcyclotetrasiloxane were charged into a reaction vessel. 100 µL of Karstedt's catalyst described above containing one weight percent of Pt in toluene was added while the solution was stirred. Gelation took place within one hour. The gel was left in the reactor for 8 hours, and then 50 parts by weight of the gel were swollen with 50 parts by weight of octamethylcyclotetrasiloxane under a shear force. A uniform and transparent paste was obtained with a viscosity of $1.8 \times 10^5$ centipoise (mPa.s).

EXAMPLE II 5 g of an organopolysiloxane with the average structure $Me_3SiO(Me_2SiO)_8(MeHSiO)_4SiMe_3$, 2.75 g of an organopolysiloxane with the average structure $HSiMe_2O(Me_2SiO)_{17}SiHMe_2$, 0.92 g of 1,5-hexadiene, and 43.5 g of octamethylcyclotetrasiloxane were charged into a reaction vessel. 20 µL Karstedt's catalyst was added while the solution was stirred. Gelation took place within one hour. The gel was left in the reactor for 8 hours, and then 50 parts by weight of the gel were swollen with 50 parts by weight of octamethylcyclotetrasiloxane under a shear force. A uniform and transparent paste was obtained with a viscosity of $6.0 \times 10^5$ centipoise (mPa.s).

EXAMPLE III 3 g of an organopolysiloxane with the average structure $Me_3SiO(Me_2SiO)_{108}(MeHSiO)_{10}SiMe_3$, 0.35 g of 1,13-tetradecadiene, and 23.5 g of octamethylcyclotetrasiloxane were charged into a reaction vessel. 10 µL Karstedt's catalyst was added while the solution was stirred. Gelation took place within one hour. The gel was left in the reactor for two days, and then it was broken into a powder by mechanical stirring. An antiperspirant was formulated with this powder and the other three ingredients shown in Table I. The antiperspirant exhibited a high degree of spreadability, smoothness, little or no residue, and dryness, among its beneficial properties.

TABLE I

| Ingredient | Amount |
| --- | --- |
| Octyl Palmitate $C_{24}H_{48}O_2$ (Emollient) | 6 parts |
| Silicone Powder (Example III) | 70 parts |
| Antiperspirant Active | 23 parts |
| Fragrance | 1 part |

In Table I, the emollient octyl palmitate is an ester of 2-ethylhexyl alcohol and palmitic acid. The antiperspirant active was Aluminum-Zirconium Tetrachlorohydrex-Gly (CTFA INCI name). It was in the form of a super-fine micronized powder. However, the formulation may contain other antiperspirant salt actives such as Aluminum Dichlorohydrate, Aluminum Sesquichlorohydrate, Aluminum-Zirconium Trichlorohydrex-Gly, Aluminum-Zirconium Pentachlorohydrex-Gly, or Aluminum-Zirconium Octachlorohydrex-Gly.

Formulated antiperspirants should contain a maximum use level of antiperspirant salt active of 20% by weight aluminum-zirconium type and 25% by weight aluminum chlorohydrate type on an anhydrous basis.

Emollient oils other than octyl palmitate can be used in the formulation, such as mineral oil, peanut oil, sesame oil, avocado oil, coconut oil, cocoa butter, almond oil, safflower oil, corn oil, cotton seed oil, castor oil, olive oil, jojoba oil, paraffin oil, cod liver oil, palm oil, soybean oil, wheat germ oil, linseed oil, and sunflower seed oil; fatty acid esters such as isopropyl myristate, isopropyl palmirate, isopropyl stearate, butyl stearate, cetyl stearate, diisopropyl adipate, isodecyl oleate, diisopropyl sebacate, and lauryl lactate; fatty acids such as lauric, myristic, palmitic, stearic, oleic, linoleic, and behenic, acid; fatty alcohols such as lauryl, myristyl, cetyl, stearyl, isostearyl, oleyl, ricinoleyl, erucyl, and 2-octyl dodecanol, alcohol; lanolin and its derivatives such as lanolin, lanolin oil, lanolin wax, lanolin alcohols, lanolin fatty acids, isopropyl lanolate, ethoxylated lanolin, and acetylated lanolin alcohols such as ACETULAN®, a trademark and product of Amerchol Corporation, Edison, N.J.; and hydrocarbons such as petrolatum and squalane.

Fragrances suitable for use in the formulation in Table I include any of the natural products and perfume oils previously enumerated.

The silicone elastomer, silicone gel, silicone paste, and silicone powder compositions of our invention have particular value in the personal care arena. Because of the unique volatility characteristics of the VMS component of these compositions, they can be used alone, or blended with other cosmetic fluids, to form a variety of over-the-counter (OTC) personal care products.

Thus, they are useful as carriers in antiperspirants and deodorants, since they leave a dry feel, and do not cool the skin upon evaporation. They are lubricious and will improve the properties of skin creams, skin care lotions, moisturizers, facial treatments such as ache or wrinkle removers, personal and facial cleansers, bath oils, perfumes, colognes, sachets, sunscreens, pre-shave and after-shave lotions, liquid soaps, shaving soaps, and shaving lathers. They can be used in hair shampoos, hair conditioners, hair sprays, mousses, permanents, depilatories, and cuticle coats, to enhance gloss and drying time, and provide conditioning benefits.

In cosmetics, they will function as leveling and spreading agents for pigments in make-ups, color cosmetics, foundations, blushes, lipsticks, lip balms, eyeliners, mascaras, oil removers, color cosmetic removers, and powders. They are useful as delivery systems for oil and water soluble substances such as vitamins. When incorporated into sticks, gels, lotions, aerosols, and roll-ons, the compositions impart a dry, silky-smooth, payout.

In addition, the compositions exhibit a variety of advantageous and beneficial properties such as clarity, shelf stability, and ease of preparation. Hence, they have wide application, but especially in antiperspirants, deodorants, in perfumes as a carrier, and for conditioning hair.

Our silicone elastomers, gels, pastes, and powders, have uses beyond the personal care arena, including their use as a filler or insulation material for electrical cable, a soil or water barrier for in-ground stabilization, or as a replacement for epoxy materials used in coil-on-plug designs in the electronics industry.

They are also useful as carrier for crosslinked silicone rubber particles. In that application, (i) they allow ease of incorporation of the particles into such silicone or organic phases as sealants, paints, coatings, greases, adhesives, antifoams, and potting compounds; and (ii) they provide for modifying rheological, physical, or energy absorbing properties of such phases in either their neat or finished condition.

In addition, our silicone elastomers, gels, pastes, and powders, are capable of functioning as carriers for pharmaceuticals, biocides, herbicides, pesticides, and other biologically active substances; and can be used to incorporate water and water-soluble substances into hydrophobic systems. Examples of some water-soluble substances are salicylic acid, glycerol, enzymes, and glycolic acid.

Other variations may be made in compounds, compositions, and methods described herein without departing from the essential features of our invention. The forms of our invention are exemplary and not limitations on its scope as defined in the claims.

We claim:

1. A method of thickening solvents comprising reacting (A) an $\equiv$Si—H containing polysiloxane of formula $R_3SiO(R'_2SiO)_a(R"HSiO)_bSiR_3$ and optionally an $\equiv$Si—H containing polysiloxane of formula $HR_2SiO(R'_2SiO)_cSiR_2H$ or formula $HR_2SiO(R'_2SiO)_a(R"HSiO)_bSiR_2H$ where R, R', and R" are alkyl groups of 1–6 carbon atoms; a is 0–250; b is 1–250; and c is 0–250; with (B) an alpha, omega-diene as only the unsaturated hydrocarbon of formula $CH_2=CH(CH_2)_xCH=CH_2$ where x is 1–20; conducting the reaction in the presence of a platinum catalyst and (C) a solvent selected from the group consisting of (i) organic compounds, (ii) compounds containing a silicon atom, (iii) mixtures of organic compounds, (iv) mixtures of compounds containing a silicon atom, and (v) mixtures of organic compounds and compounds containing a silicon atom; and continuing the reaction until a gel is formed by crosslinking and addition of $\equiv$Si—H across double bonds in the alpha, omega-diene.

2. A method according to claim 1 including the further steps of adding additional solvent to the gel, and subjecting the solvent and the gel to shear force until a paste is formed.

3. A method according to claim 1 including the further step of using mechanical force to crumble the gel until a powder is obtained.

4. A gel prepared according to the method in claim 1.

5. A paste prepared according to the method in claim 2.

6. A powder prepared according to the method in claim 3.

7. A method of thickening silicone oils to gel-like consistency comprising reacting (A) an $\equiv$Si—H containing polysiloxane of formula $R_3SiO(R'_2SiO)_a(R"HSiO)_bSiR_3$ and optionally an $\equiv$Si—H containing polysiloxane of formula $HR_2SiO(R'_2SiO)_cSiR_2H$ or formula $HR_2SiO(R'_2SiO)_a(R"HSiO)_bSiR_2H$ where R, R', and R" are alkyl groups of 1–6 carbon atoms; a is 0–250; b is 1–250; and c is 0–250; with (B) an alpha, omega-diene as the only unsaturated hydrocarbon of formula $CH_2=CH(CH_2)_xCH=CH_2$ where x is 1–20; conducting the reaction in the presence of a platinum catalyst and (C) a silicone oil of formula $R^1_3SiO(R^1_2SiO)_ySiR^1_3$ or $(R^1_2SiO)_z$ where $R^1$ is an alkyl group of 1–20 carbon atoms or an aryl radical, y is 0–375, and z is 3–9; and continuing the reaction until a gel is formed by crosslinking and addition of $\equiv$Si—H across double bonds in the alpha, omega-diene.

8. A method according to claim 7 including the further steps of adding additional solvent to the gel, and subjecting the solvent and the gel to shear force until a paste is formed.

9. A method according to claim 7 including the further step of using mechanical force to crumble the gel until a powder is obtained.

10. A gel prepared according to the method in claim 7.

11. A paste prepared according to the method in claim 8.

12. A powder prepared according to the method in claim 9.

13. A product containing the gel of claim 10 selected from the group consisting of antiperspirants, deodorants, skin creams, skin care lotions, moisturizers, ache removers, wrinkle removers, facial cleansers, bath oils, perfumes, colognes, sachets, sunscreens, pre-shave lotions, after-shave lotions, liquid soaps, shaving soaps, shaving lathers, hair shampoos, hair conditioners, hair sprays, mousses, permanents, depilatories, cuticle coats, make-ups, color cosmetics, foundations, blushes, lipsticks, lip balms, eyeliners, mascaras, oil removers, cosmetic removers, delivery systems for oil and water soluble substances, and powders; including products in the form of sticks, gels, lotions, aerosols, and roll-ons.

14. A product containing the gel of claim 10 and a material selected from the group consisting of crosslinked silicone rubber particles, pharmaceuticals, biocides, herbicides, pesticides, water, and water-soluble substances.

15. A method of treating hair or skin comprising applying to the hair or skin a product of claim 13.

16. A method of modifying rheological, physical, or energy absorbing properties, of silicone or organic phases selected from the group consisting of sealants, paints, coatings, greases, adhesives, antifoams, and potting compounds, comprising incorporating therein the gel of claim 10 containing crosslinked silicone rubber particles.

17. A method of filling or insulating an electrical cable comprising incorporating therein the gel of claim 10.

18. A method of stabilizing in-ground soil or water barriers comprising incorporating into soil the gel of claim 10.

* * * * *

UNITED STATES PATENT AND TRADEMARK OFFICE
CERTIFICATE OF CORRECTION

PATENT NO.  : 5,654,362
DATED       : August 5, 1997
INVENTOR(S) : William J. Schulz, et. al.

It is certified that error appears in the above-identified patent and that said Letters Patent is hereby corrected as shown below:

Title page, item [75], inventors: change the second inventor's name to -- Zhang --.

Signed and Sealed this

Fifteenth Day of December, 1998

Attest:

BRUCE LEHMAN

*Attesting Officer*          *Commissioner of Patents and Trademarks*